(No Model.)
N. KITT & J. SCHMADEL.
CASTER FOR TRUNKS.
No. 279,397. Patented June 12, 1883.
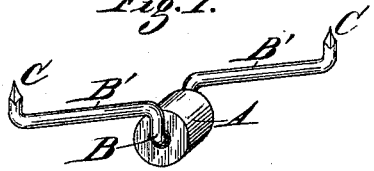
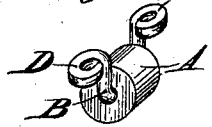
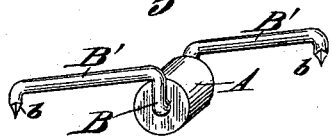
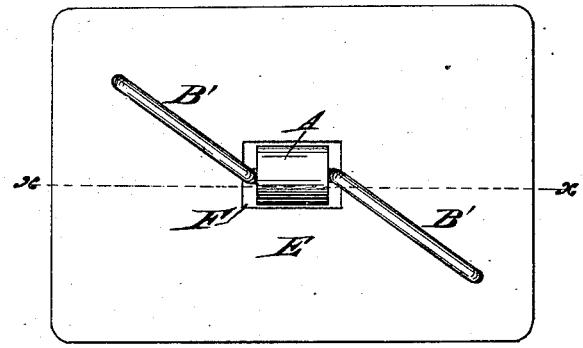
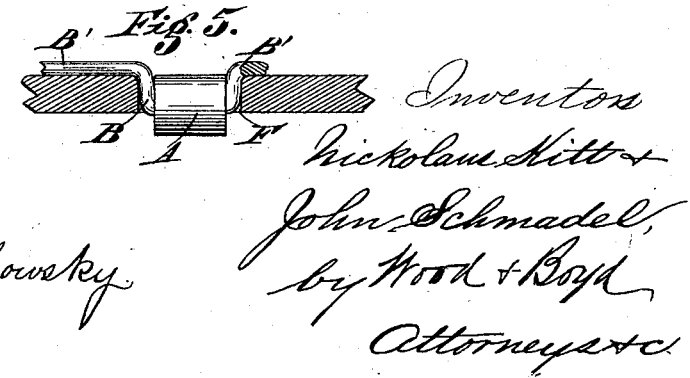
Attest,
Jno. E. Wiles.
Adolph Gluchowsky.
Inventors
Nickolaus Kitt &
John Schmadel,
by Wood & Boyd
Attorneys &c.

UNITED STATES PATENT OFFICE.

NICKOLAUS KITT AND JOHN SCHMADEL, OF CINCINNATI, OHIO.

CASTER FOR TRUNKS.

SPECIFICATION forming part of Letters Patent No. 279,397, dated June 12, 1883.

Application filed January 25, 1883. (No model.)

*To all whom it may concern:*

Be it known that we, NICKOLAUS KITT and JOHN SCHMADEL, citizens of the United States, and residents of Cincinnati, in the county of Hamilton and State of Ohio, have invented certain new and useful Improvements in Casters, of which the following is a specification.

Our invention relates to improvements in casters for trunks or other objects where casters are desirable or necessary.

The object of our invention is to provide a wire journal for the roller, of such construction that the wire itself prevents endwise movements of the roller, while permitting the latter to freely revolve on its axis. This we accomplish in the manner hereinafter described and claimed, and illustrated in the accompanying drawings, in which—

Figure 1 is a perspective view of our improved caster made with the roller-shaft extended so as to rest upon the bottom or floor of the object, and having the ends thereof bent upward to form points or nails for securing the caster in position. Fig. 2 represents another form of our improvement, having the roller-shaft bent upward and then being bent a circular form to provide eyes through which screws are passed to secure the caster in position. Fig. 3 represents the preferred form of our invention, in which the roller-shaft is bent upward and outward, as in Fig. 1, and the points of same being bent downward instead of upward. Fig. 4 represents a top plan view of Fig. 3. Fig. 5 is a section on line $xx$, Fig. 4.

In the form shown in Figs. 3, 4, and 5, the roller is passed downward through an opening in a cleat, and the downwardly-projecting points on the ends of the bent roller-shaft are driven into the upper side of the cleat. In the forms shown in Figs. 1, 3, 4, and 5, the horizontally-projecting arms are bent so as to extend laterally at any suitable angle to that of the length of the roller, but preferably as shown in Fig. 4.

A represents the roller; B, the continuous rod or wire which forms the shaft for the roller and also the supporting-frame of the caster; B′ B′, the horizontally-projecting arm, of the frame; C C, the pointed ends of wire rod B, projecting upward and into the bottom of the object to be supported. *b b* represent the ends of arms B′ B′, projecting downward and into cleat E. D D represent screw or nail eyes formed by the bending of the rod B, as shown in Fig. 2. F represents a slot or mortise made in cleat E. The arms B′ B′ serve to steadily secure or mount the roller in position upon its U-shaped shaft, thereby avoiding all torsional movement thereof or strain thereon.

It will be seen that the wire is bent upright closely against the ends of the roller, whereby the wire itself prevents endwise movements of the roller on its journal, while permitting it to freely revolve.

We are aware that it is not new to form the journal of a roller from a piece of wire bent into shape of a yoke, the ends of which are adapted to be connected with a trunk, and such, therefore, we do not broadly claim.

We claim—

A caster composed of the roller A and the wire B, passed through the roller and bent upward to form side arms, which bear directly against the ends of the roller to prevent longitudinal movement thereof, said wire being then bent laterally with its ends terminating in points adapted to be driven into the object to be supported, whereby the roller and the side arms of the wire can be inserted through the same opening, or the wire be secured to the under side of the object without employing a separate bearing, substantially as shown and described.

In testimony whereof we have hereunto set our hands in the presence of two subscribing witnesses.

NICKOLAUS KITT.
      JOHN SCHMADEL.

Witnesses:
 JNO. E. JONES,
 ADOLPH GLUCHOWSKY.